United States Patent
Marsala et al.

(10) Patent No.: US 9,696,450 B2
(45) Date of Patent: *Jul. 4, 2017

(54) INDUCED POLARIZATION LOGGING WITH BOREHOLE TO SURFACE ELECTROMAGNETIC TRANSMITTER

(71) Applicants: Saudi Arabian Oil Company, Dhahran (SA); BGP Arabia Co. Ltd., Al-Khobar (SA)

(72) Inventors: Alberto Marsala, Bergamo (IT); Muhammad H. Al-Buali, Al-Hassa (SA); Tang Biyan, Zhuozhou (CN); Zhanxiang He, Zhuozhou (CN)

(73) Assignees: Saudi Arabian Oil Company, Dhahran (SA); BGP Arabia Co, Ltd., Al-Khobar (SA)

( * ) Notice: Subject to any disclaimer, the term of this patent is extended or adjusted under 35 U.S.C. 154(b) by 0 days.

This patent is subject to a terminal disclaimer.

(21) Appl. No.: 14/221,854

(22) Filed: Mar. 21, 2014

(65) Prior Publication Data

US 2014/0203810 A1    Jul. 24, 2014

Related U.S. Application Data

(63) Continuation of application No. 13/090,691, filed on Apr. 20, 2011, now Pat. No. 8,680,866.

(51) Int. Cl.
*G01V 3/20* (2006.01)
*G01V 3/30* (2006.01)
(Continued)

(52) U.S. Cl.
CPC ............. *G01V 3/20* (2013.01); *G01V 3/30* (2013.01); *E21B 47/122* (2013.01); *G01V 3/26* (2013.01); *G01V 3/28* (2013.01); *G01V 3/38* (2013.01)

(58) Field of Classification Search
CPC .................................. G01V 3/20; G01V 3/30
(Continued)

(56) References Cited

U.S. PATENT DOCUMENTS 4,422,043 A * 12/1983 Meador .................... G01V 3/30
324/338
4,431,963 A    2/1984 Walkow
(Continued)

FOREIGN PATENT DOCUMENTS

WO    2009158189 A2    12/2009

OTHER PUBLICATIONS

Richard Fitzpatrick Jul. 14, 2007; http://farside.ph.utexas.edu/teaching/302l/lectures/node34.html.*
(Continued)

*Primary Examiner* — Jermele M Hollington
*Assistant Examiner* — Christopher McAndrew
(74) *Attorney, Agent, or Firm* — Bracewell LLP; Constance G. Rhebergen; Albert B. Kimball, Jr.

(57) ABSTRACT

An electromagnetic energy transmitter is provided for induced polarization logging with a borehole to surface electromagnetic (BSEM) transmitter. The transmitter is lowered into a well borehole to a desired location in a well borehole to emit electromagnetic energy for the surveys. The transmitter affords more accurate measurements of its position in the well borehole. The transmitter also senses pressure and temperature conditions at its borehole location to provide indications of detected potential problems in the well from the survey or other sources, and to reduce risks and enhance safety and quality of the operations.

10 Claims, 6 Drawing Sheets

(51) Int. Cl.
  *E21B 47/12* (2012.01)
  *G01V 3/28* (2006.01)
  *G01V 3/26* (2006.01)
  *G01V 3/38* (2006.01)
(58) Field of Classification Search
  USPC ........................................................ 324/338
  See application file for complete search history.

(56) References Cited

U.S. PATENT DOCUMENTS

| | | | | |
|---|---|---|---|---|
| 4,662,209 | A * | 5/1987 | Brown | .................. E21B 45/00 181/103 |
| 4,739,325 | A | 4/1988 | MacLeod | |
| 4,785,247 | A | 11/1988 | Meador et al. | |
| 4,875,015 | A * | 10/1989 | Ward | ....................... G01V 3/26 324/323 |
| 5,869,968 | A | 2/1999 | Brooks et al. | |
| 7,482,578 | B2 * | 1/2009 | Randall | .................. G01T 7/005 250/261 |
| 7,622,916 | B2 * | 11/2009 | Meeten | ................. G01N 27/72 324/220 |
| 7,665,544 | B2 * | 2/2010 | Forgang | .................. G01V 3/20 175/50 |
| 2005/0139759 | A1 * | 6/2005 | Pitts | ......................... G01V 5/10 250/269.6 |
| 2005/0263281 | A1 * | 12/2005 | Lovell | .................. E21B 47/123 166/255.1 |
| 2008/0128166 | A1 * | 6/2008 | Forgang | .................. G01V 3/20 175/50 |
| 2008/0221800 | A1 * | 9/2008 | Gladkikh | ................ G01V 3/32 702/11 |
| 2009/0037111 | A1 * | 2/2009 | Radtke | .................. G01V 11/00 702/11 |

OTHER PUBLICATIONS

International Search Report and Written Opinion for Related PCT Application PCT/US2012/034378, Mar. 14, 2013.

He, Z. et al., "Geo-Electrical Anomaly Pattern of Reservoir and Geo-Electrical Methods for Direct Reservoir Detection", SEG 2007 Annual Meeting.

He, Z. et al., "Petroleum Electromagnetic Prospecting Advances and Case Studies in China", Sury Geophys, Jan. 15, 2010, DOI 10, 1007/s10712-00909093-z, Springler.

Wang, C. et al., "Lithology Study Using TFEM Technique in Western Qaidam Basin", SEG/New Orleans 2006 Annual Meeting.

* cited by examiner

INDUCED POLARIZATION LOGGING WITH BOREHOLE TO SURFACE ELECTROMAGNETIC TRANSMITTER

CROSS REFERENCE TO RELATED APPLICATIONS

The present application is a continuation of Applicant's U.S. patent application Ser. No. 13/090,691, filed Apr. 20, 2011, priority for which is claimed pursuant to 35 U.S.C. 120, which has been issued as U.S. Pat. No. 8,689,866, dated Mar. 25,2014.

BACKGROUND OF THE INVENTION

1. Field of the Invention

The present invention relates to an electromagnetic energy source or transmitter for borehole to surface electromagnetic surveying and mapping of subsurface formations.

2. Description of the Related Art

Electromagnetic methods to obtain data regarding subsurface earth formations and their constituent fluid contents have been used for several purposes. Among these have been petroleum reservoir characterization and front-tracking in enhanced oil recovery operations.

One of these electromagnetic methods has been what is known as the borehole-surface or borehole to surface electromagnetic method (BSEM). Two electrodes have been used in the borehole-surface electromagnetic energy method. The first electrode has been in a well borehole of what is known as the transmitter well, transmitting electromagnetic energy, and the other, which may be a ground electrode, has been at the earth's surface along with a receiver array. The receiver array has been located at spaced positions on the surface conforming to the reservoir of interest to detect the energy field after passage through the earth from the first or transmitter electrode.

In a typical operation, Borehole to Surface Electromagnetic (BSEM) utilized an electromagnetic source in the borehole and an array (typically 600-2000 or more) of receivers on the surface, thus allowing the mapping of the fluid (typically oil and water) distribution in large areas of the reservoir a few (2-4) kilometers away from the well in which the transmitter electrode had been positioned.

The transmitter electrode located in the well was activated at depths of interest. The signal emitted on activation could be a single frequency or multiple frequencies. The resultant electromagnetic field which then occurred was sensed in the time and frequency domains by the receiver array. Surveys of this type could then be repeated after passage of a period of time from the transmitter well to track the subsurface fluid migration.

An interface in a subsurface formation between solids and liquids produces induced polarization and frequency scattering responses to the emitted signals and the responses were received and recorded. The recorded data was processed and analyzed to map boundaries of subsurface reservoirs of interest and evaluate other nearby formations. The information obtained was important in assessing the sweep efficiency, or the percentage of original oil displaced from a formation by a flooding fluid, and in locating potential bypassed oil zones, thus ultimately increasing oil recovery.

So far as is known, no provision has been made to obtain a precisely accurate measurement of the depth position of the transmitter downhole. An indirect measurement was possible only from measurements of the length of cable passing from the cable reel or drum in the wireline truck into the well. However, this length measurement did not take into account elongation of the cable at increasing depths in the well. This gave rise to an inability to accurately determine well depth measurements of formations and correlate actual depth of the transmitter emissions of energy with data representative of subsurface conditions.

During BSEM surveying, other well logging operations with other well logging tools present in the well borehole were not, so far as is known, conducted. The purpose of this was so that the transmitter electrode could be easily moved to desired depths in the well. Thus, there was no capability to monitor downhole well conditions during the BSEM survey. Thus, so far as is known, no provision was made to detect incipient abnormal conditions which might provide advance notice of one or more of possible problems, such as overheating of the transmitter electrode, starting of an ignition in the well, a gas kick, overpressure, or the like.

SUMMARY OF THE INVENTION

Briefly, the present invention provides a new and improved electromagnetic energy transmitter mounted with a wireline for electromagnetic surveys of subsurface earth formations from a well borehole which has a casing installed along its extent into the earth to a location near a formation of interest, the casing being formed of lengths of tubular members connected at end portions to adjacent tubular members by casing collars. The electromagnetic energy transmitter includes an electromagnetic energy source emitting electromagnetic energy in the form of electric current when activated, and a control circuit activating the conductive bar to emit electromagnetic energy for a selected time and duration. The electromagnetic energy transmitter also includes a sonde body housing the control circuit. The sonde body is adapted to be lowered by the wireline in the well borehole to the location near the formation of interest. An upper connector subassembly is mounted above the sonde body connecting the control circuit to the wireline and permits the flow of electrical current to the electromagnetic energy source. A lower connector subassembly is mounted below the sonde body and connects the electromagnetic energy source to the control circuit. The electromagnetic energy transmitter also includes a casing collar locator mounted in the sonde body to provide indications of movement of the sonde body past casing collar in the casing during movement of the transmitter through the well borehole. The electromagnetic energy transmitter further includes a fluid pressure sensor mounted in the sonde body for measuring fluid pressure in the well borehole at the location of the sonde body; and a temperature sensor mounted in the sonde body for measuring temperature in the well borehole at the location of the sonde body.

The present invention also provides a new and improved method of electromagnetic surveying subsurface earth formations from a well borehole which has a casing installed along its extent into the earth to a location of interest near a formation of interest, the casing being formed of lengths of tubular members connected at end portions to adjacent tubular members by casing collars. According to the present invention electromagnetic energy source with a sonde body connected therewith is lowered to the location of interest in the borehole. A measure is formed with the casing collar locator of the number of casing collars past which the source and sonde body travel during the step of lowering to determine the depth of the source and sonde body in the borehole based on the measured number of casing collars. The casing collar locator is then deactivated when the source and the sonde body are at the location of interest. Electromagnetic energy is then emitted from the source at the location of interest to travel through the subsurface formations for electromagnetic energy surveying of the subsurface earth formations.

DETAILED DESCRIPTION OF THE PREFERRED EMBODIMENTS

Figure 1:
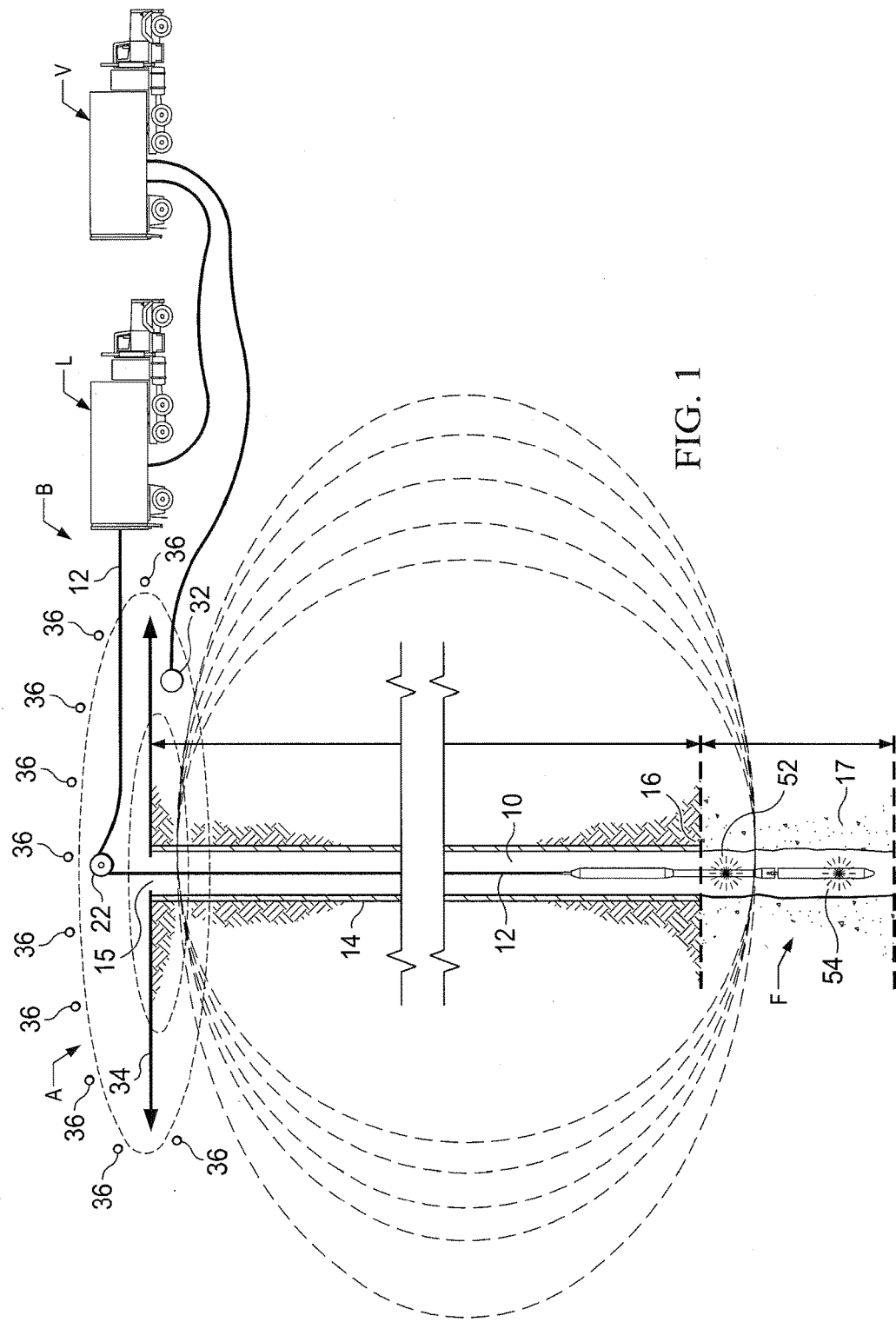
FIG. 1 is a schematic diagram, taken partly in cross-section, of a borehole to surface electromagnetic survey system disposed in a well borehole to obtain borehole to surface electromagnetic survey data according to the present invention.
Figure 2:
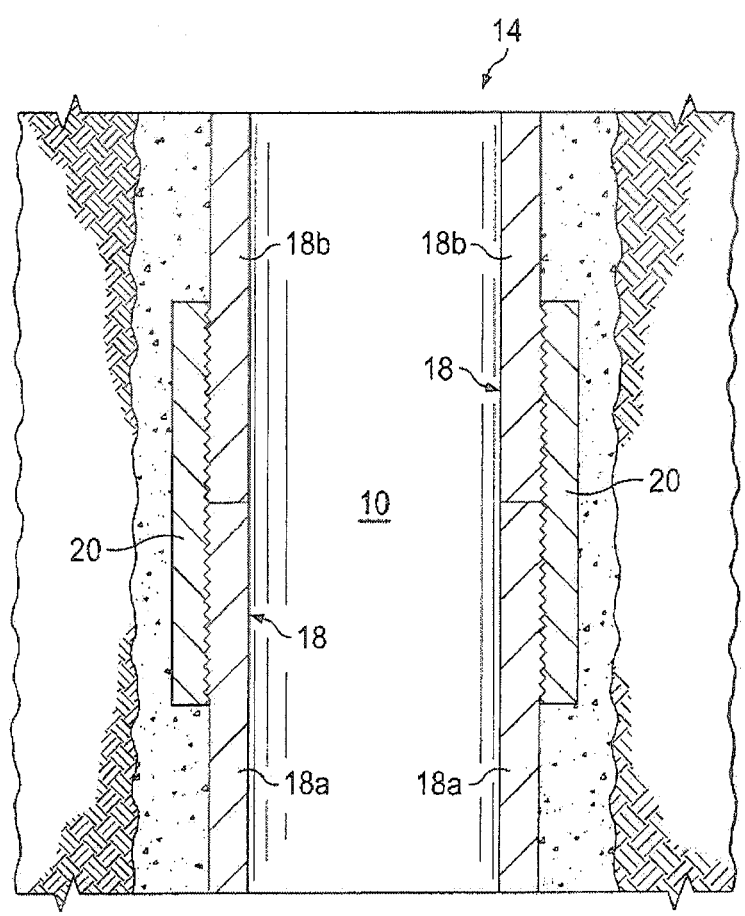
FIG. 2 is an enlarged view of a portion of the well casing of the structure illustrated in FIG. 1.
Figures 3A, 3B, 3C:
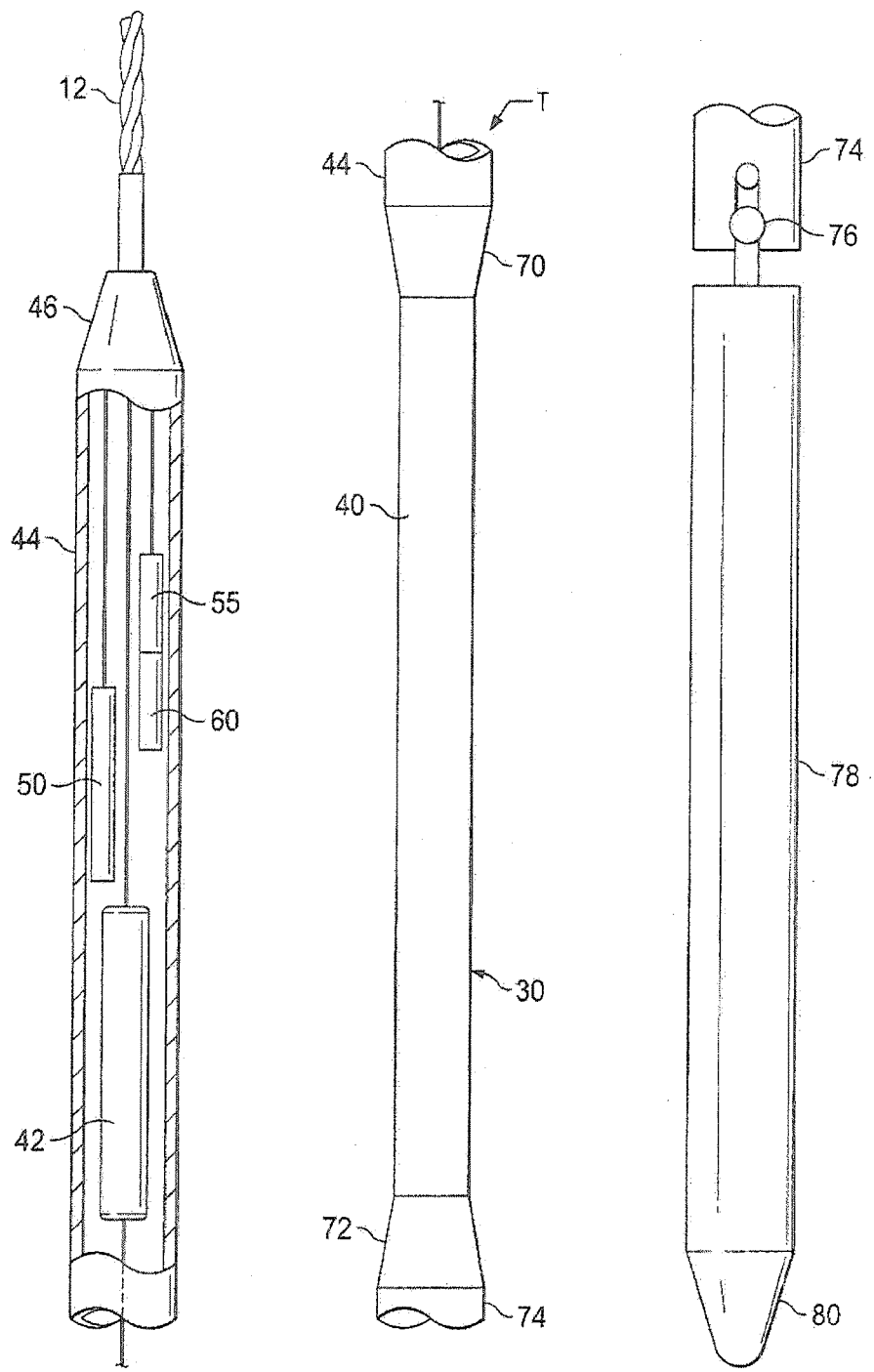
FIG. 3A is a schematic diagram of an upper portion of a borehole to surface electromagnetic transmitter according to the present invention.
FIG. 3B is a schematic diagram of an intermediate portion of a borehole to surface electromagnetic transmitter according to the present invention.
FIG. 3C is a schematic diagram of a lower portion of a borehole to surface electromagnetic transmitter according to the present invention.

In the drawings, a borehole to surface electromagnetic (BSEM) survey system B is shown schematically in FIG. 1 in connection with a well borehole 10 which has been drilled into the earth through rock in subsurface earth formations F having hydrocarbon fluids of interest. An electromagnetic energy transmitter T (FIGS. 3A, 3B and 3C) according to the present invention is mounted with a wireline 12 for electromagnetic surveys of the subsurface earth formations F from the well borehole 10. As is typical, the well borehole 10 has a casing 14 (FIGS. 1 and 2) installed along its extent into the earth to a location near a reservoir. A typical casing string 14 extends several thousands of feet from wellhead 15 at or above ground level to a lowermost casing section or casing shoe 16 within the wellbore 10. Below the depth of the casing shoe at 16, the lower portion of the well where no casing is present is what is known as open hole 17.

The casing 14 is formed of lengths of tubular joint members 18 (FIG. 2) connected at upper and lower end portions 18a and 18b to adjacent tubular members 18 by casing collars 20. The ends of each tubular joint or segment 18 of casing string 14 are externally threaded, and the collars 20 are internally threaded to mate with the threaded portion of the adjacent casing members 18. As is conventional, where two pieces of casing pipe 18 are joined with a collar 20, there may in some wells be a small gap between the adjacent ends of the two sections of casing. Alternatively, in what is known as "flush joint" casing, no gap is present between the ends of adjacent casing member sections which are held in abutting relationship by collar 20.

In connection with borehole to surface electromagnetic (BSEM) surveys, the transmitter T and wireline cable 12 are suitably supported at the wellhead 15 such as by a sheave wheel 22, which is used to raise and lower the transmitter T in the wellbore 10. During the borehole-surface or borehole to surface electromagnetic surveys, two electrodes are used. A first electrode 30 (FIG. 3B) of the transmitter T according to the present invention is in the well borehole 10, which serves as the transmitter well to transmit electromagnetic energy of desired frequency and amplitude into earth formations around the well borehole for travel through the subsurface earth formations F. The other electrode 32 (FIG. 1), which may be a ground electrode, is at the earth's surface 34 along with a receiver array A indicated schematically in FIG. 1. The receiver array A is composed of electromagnetic energy receivers 36 located at spaced positions on the earth over a surface area conforming to dimensions of a reservoir of interest. Receivers in the receiver array A detect the transmitted energy field after passage through the earth from the transmitter electrode T. A borehole to surface electromagnetic survey allows mapping of the fluid (typically oil and water) distribution in large areas of the reservoir a few (typically 2-4) kilometers away from the well in which the transmitter electrode had been positioned. Parameters of interest in such a survey are resistivity and induced polarization or IP, as will be set forth.

The transmitter electrode T located in the well 10 is activated at depths of interest. The resultant electromagnetic field is sensed in the time and frequency domains by the receiver array A. Surveys of this type are repeatable at required intervals over a period of time to track migration of subsurface fluids.

The electromagnetic energy transmitter T includes a conductive metal bar or rod 40 of copper or other similar conductive material. The conductive electrode energy source 40 is operatively connected to a control circuit 42 which responds to control signals sent from the surface from a transmitter vehicle V at the surface over the wireline 12 and activates the conductive electrode 40 to emit electromagnetic energy of the desired frequency and amplitude for a selected time and duration during BSEM surveying.

According to the present invention, the borehole depths at which the BSEM survey electromagnetic energy is emitted by the transmitter T during surveys are obtained in a manner to be set forth. The borehole depth readings are recorded along with the sensed electromagnetic fields corresponding to emissions at that depth in a suitable data memory in a computer or data processor in a logging vehicle or truck L (FIG. 1). Once recorded, the BSEM data and depth measurements are transferred as needed into the data processing system or computer for on site processing and analysis and are available for further processing and analysis elsewhere. Records of the time and content of the electromagnetic energy specified by control signals are also furnished from the transmitter vehicle V to data recoding computer or processor equipment in the logging vehicle or truck L.

The electromagnetic energy transmitter T also includes a sonde body 44 (FIGS. 3A and 3B) connected to the wireline 12 by an upper connector subassembly 46. The transmitter T is adapted to be lowered by the wireline 12 in the well borehole 10 to the various depths indicated as adjacent or near the formations of interest for BSEM surveying. The upper connector subassembly 46 is mounted above the sonde body 44 operatively coupling the control circuit 42 to the wireline 12 to provide electrical energy as well as mechanical connection for the transmitter T. The upper connector subassembly 46 permits the flow of electrical current to provide power for signals emitted by the electromagnetic energy source 40 during surveys and passage of control signals to the control circuit 42.

With the present invention, the electromagnetic energy transmitter T is provided with a casing collar locator 50 mounted within the sonde body 44 and electrically connected through connector subassembly 46 and wireline 12 with surface electronics in the logging vehicle L to provide indications of movement of the transmitter T and sonde body 44 past casing collars 20 in the casing string 14 during movement of the transmitter T through the well borehole 10. The casing collar locator 50 may be one of several available types, such as those available from Sondex (General Electric Co.) of Hampshire, UK. In the casing collar locator 50, magnetic sensors detect the presence of casing collars 20 by sensing larger metallic mass at the location of the casing collar at the ends of the sections 18 of casing than along the length of the casing sections 18.

Electronic circuitry within the casing collar locator 50 forms electrical signals usually in the form of pulses as the locator passes successive casing collars 20 during movement of the transmitter T through the well borehole 15. The casing collars 20 are located at defined known lengths from each other according to the known distance or length of a casing section 18 between its ends 18. Thus a count of the number of casing collars 20 passed during movement of the transmitter to a target depth such as shown at 52 or 54, for example, either in the open hole region 17 or within the casing string 14 indicates accurately for the purposes of the present invention the depth of the transmitter T. The casing collar locator 50 thus measures the position of the transmitter T relative to the last casing point or casing shoe at depth 16. The casing collar locator 50 is provided with on-off switching capability so that measurements are not being made with the locator during the transmission of electromagnetic signals from the transmitter T. Thus, the casing collar locator 50 is sensing and transmitting signals indicating the presence of casing collars only at those times when the locator is passing through the casing shoe 16 before entering in the target zone.

The transmitter T of the present invention thus compensates for any potential bias or distortion in the accuracy of depth locations at which the transmitter T is activated which are induced by the elongation of the wireline cable from surface to the target depth. This has been found to be satisfactorily accurate even when the transmitter is located at a depth in open hole 17. Normally there are only a few feet of open hole section at the end of a cased well. The possible elongation of the cable in the last few feet of open-hole has been found to be negligible compared to the thousands of feet in the cased section 14.

The electromagnetic energy transmitter T in accordance with the present invention is also provided with a pressure and temperature sensing capability which includes a fluid pressure sensor 55 and a temperature sensor 60 mounted in the sonde body 44. The fluid pressure sensor 55 measures fluid pressure in the well borehole at the location of the sonde body 44 within the wellbore 10. The fluid pressure sensor 55 is electrically connected with surface electronics in the logging vehicle L to provide indications of fluid pressure at the location of transmitter T. The pressure sensor 55 may be one of several available types, such as those available from Omega Data Services Limited of Aberdeen, Scotland.

The temperature sensor 60 measures fluid pressure in the well borehole at the location of the sonde body 44 within the wellbore 10. The temperature sensor 60 is electrically connected with surface electronics in the logging vehicle L to provide indications of temperature conditions at the location of transmitter T. The temperature sensor 60 may be one of several available types, such as those available from Omega Data Services Limited of Aberdeen, Scotland.

According to the present invention, it is now possible to monitor the downhole conditions of pressure as well as temperature during BSEM surveys. In this manner, well crews are able to identify and take steps to prevent a potential problem from occurring. Examples of such potential problems are overheating of the transmitter electrode T; an ignition starting in the well borehole, a gas kick in the well, an overpressure condition, and the like. Accordingly, survey crews and well crews are able to sense and detect conditions which might give rise to the risk of blowout or ignition, or might affect the quality of data.

It has also been found that due to the very low electromagnetic frequency typically used in BSEM surveys, energy emitted during the surveys does not affect the pressure and temperature measurements sensed by the sensors 55 and 60, respectively. The electromagnetic current could, however, affect pressure and temperature conditions downhole. The present invention by including pressure sensors and temperature sensors integrated in the BSEM transmitter T is able to detect possible anomalous increase of temperature or pressure, or both, due to a number of reasons. Examples are overheating of the BSEM transmitter electrode or antenna 30, with the risk of melting the transmitter T or wireline cable 12; an anomalous hydrocarbon overpressure bubble entering the well; and possible ignition of gases started downhole, whether or not triggered by the electromagnetic current emitted. The pressure and temperature readings sensed with the present invention are important for timely preventive measures to be taken at the surface, such as stopping transmission of the BSEM signals, activating the well control procedures, emergency measures as required.

A lower connector subassembly 70 (FIG. 3B) is mounted below the sonde body 44 and connects the conductive metal bar 40 of electrode 30 source to the control circuit 42 so that electrical power is provided to the metal bar 40 to emit electromagnetic energy of the desired frequency and amplitude for a selected time and duration during BSEM surveying.

The conductor bar 40 is a solid bar of requisite thickness for mechanical strength formed of copper and is, for example about 0.8 m in length. A weight bar connector 72 is mounted at a lower end of conductor bar 40 to connect a swivel connector subassembly 74 with upper portions of the transmitter T. The swivel connector subassembly 74 provides as indicated schematically at 76 for pivotal movement and connection of a weight bar member 78 of a suitably heavy material to the upper portions of the transmitter T. The weight bar member 78 assists as is conventional, in proper orientation and movement of the transmitter T in the well borehole 10. Typically, as indicated at 80 a nose plug is mounted below the weight bar 78 for facilitating movement of the transmitter T through the well borehole 10.

In the operation of the present invention borehole to surface electromagnetic surveying of subsurface earth formations is performed in the well borehole 10 when the transmitter T with sonde body 44 are lowered to locations of interest in the borehole in the free hole zone 17 borehole below the casing 18. A measure is formed, during such movement, with the casing collar locator 50 of the number of casing collars 20 past which the transmitter and sonde body travel during lowering and the measurements forwarded to the surface over the wireline 12 and recorded in the logging truck L. In this manner, the depth of the transmitter T in the borehole 10 is measured and recorded based on the measured number of casing collars. The casing collar locator 50 is then deactivated when transmitter T is at a location of interest. Electromagnetic energy is then emitted from the conductive bar 40 at the location of interest to travel through the subsurface formations for electromagnetic energy surveying of the subsurface earth formations.

Figure 4:
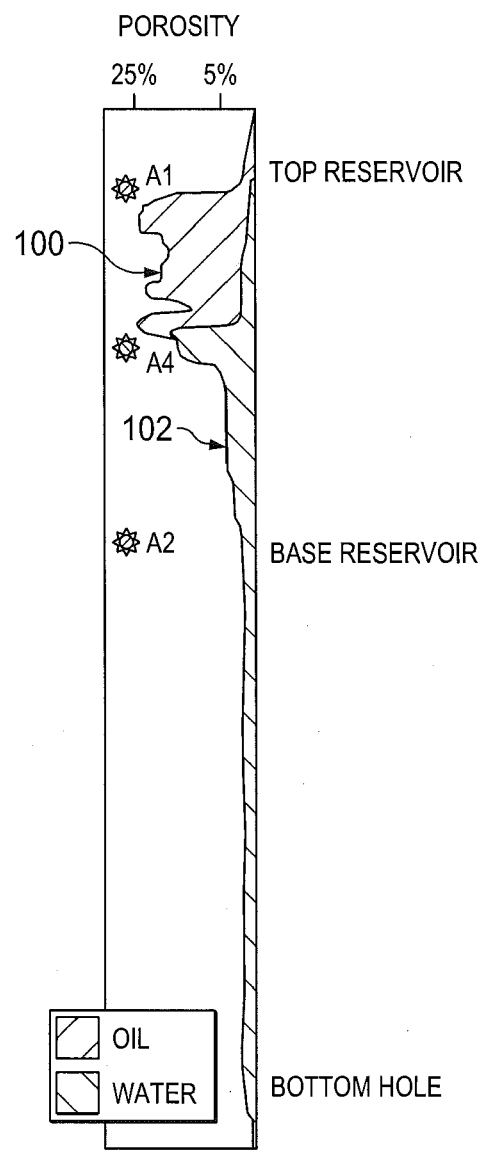
FIG. 4 is an example display of well log data from conventional well logs regarding subsurface formations as a function of depth in a well borehole.

FIG. 4 is a simplified example display of well log data from conventional well logs as a function of borehole depth regarding subsurface formations as a function of depth in the well borehole 10. The well log or plot in FIG. 4 illustrate as a function of depth over a range of porosity values from below 5% to about 25% the relative presence of oil as indicated at 100 and water as indicated at 102. The measurements from which the data displayed in FIG. 4 were attained from an example well in an existing reservoir.

Another measurement of interest in addition to the well logs of FIG. 4 obtainable from the same subsurface formations is data obtainable from BSEM surveys. One of the parameters obtainable from data from BSEM surveys of subsurface earth formations from a well borehole is Induced Polarization or IP. Plots or maps of induced polarization for an investigative layer in the subsurface formations are utilized in discriminating oil from water zones in the formations near or even within a few kilometers from the well borehole. If the induced polarization maps obtained from BSEM survey data indicate a high induced polarization measure, this indicates that there is a high oil saturation in the investigated layer. Conversely, if the induced polarization maps obtained from BSEM survey data indicate a low induced polarization measure, this indicates that there is a water saturation in the investigated layer.

Figure 5:
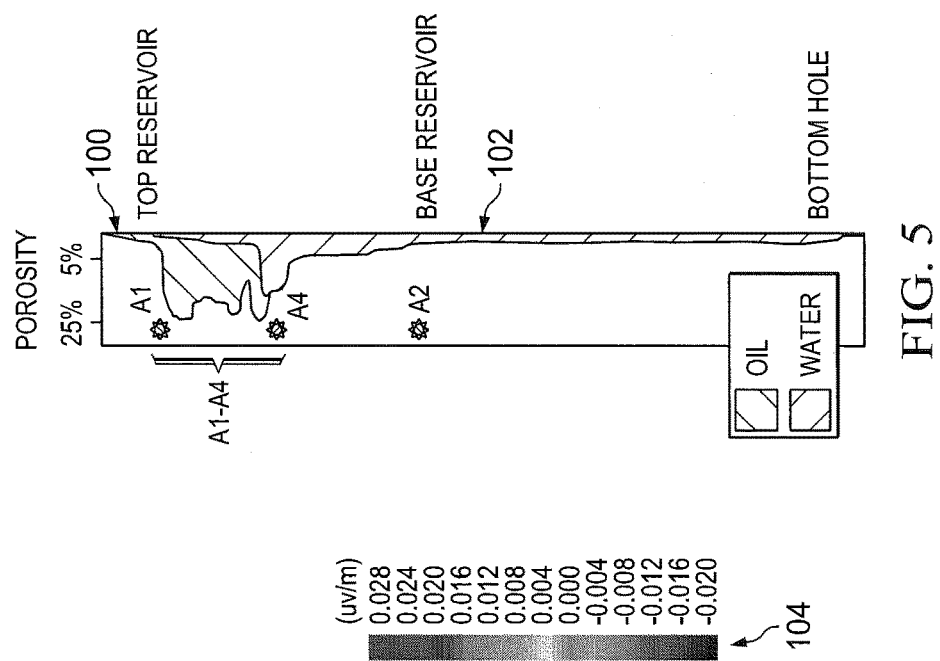
FIG. 5 is a plot of induced polarization data obtained from subsurface formations over a range of depths during borehole to surface electromagnetic surveying and mapping of subsurface formations adjacent the well borehole in which the well log data of FIG. 4 was obtained.

FIG. 5 is a plot or map of induced polarization as a function of surface area or extent based on BSEM survey data for a layer indicated as extending from depth A1 through depth A4 in the well which is the subject of the well logs plotted in FIG. 4. For ease of reference and analysis, the well log plot is also included in FIG. 5. The induced polarization measurements as determined from BSEM surveys are plotted in the color key 104 for the map of FIG. 5. The locations or depths so indicated in the well of depths A1 and A4 are depicted in the well log plots of FIGS. 4 and 5.

Figure 6:
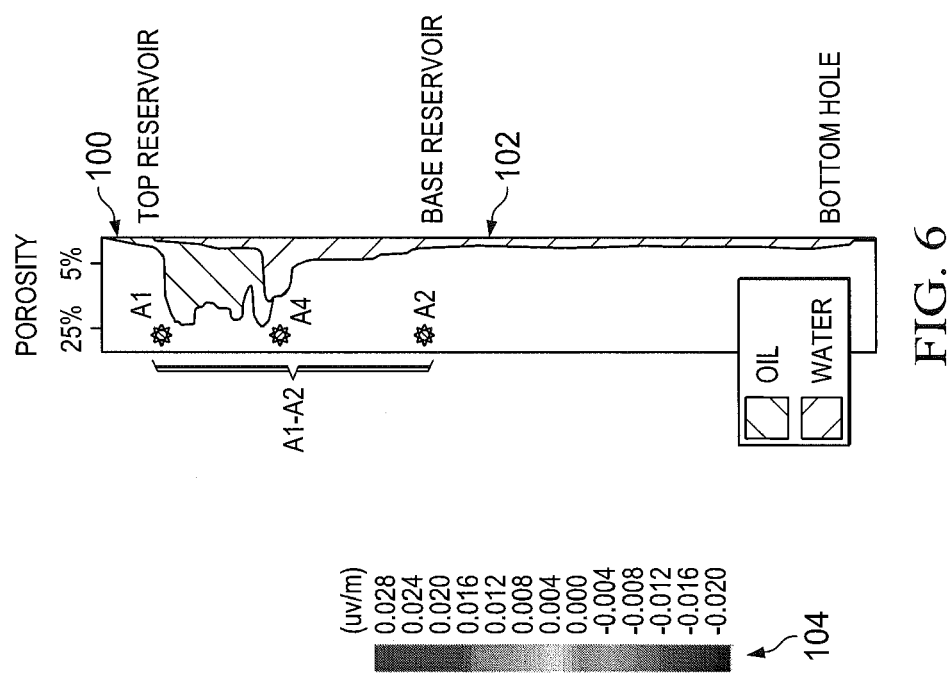
FIG. 6 is a plot of induced polarization data obtained from subsurface formations over a different range of depths than FIG. 5 during borehole to surface electromagnetic surveying and mapping of subsurface formations adjacent the well borehole in which the well log data of FIG. 4 was obtained.

FIG. 6 is a plot or map of induced polarization based on BSEM survey data for a layer determined according to the present invention as extending from the depth A1 through depth A2 in the same well which is the subject of the well logs plotted in FIG. 4. For ease of reference and analysis, the well log plot is also included in FIG. 6. The depth A2 is also indicated in the well log plotted in FIG. 4 along with depths A1 and A4. The map co-ordinates are plotted in the margins of FIG. 6. As is evident, the areas which are the subject of FIGS. 5 and 6 substantially overlap. The induced polarization measurements as determined from BSEM surveys are plotted in the color key 104 for the map of FIG. 5 which is the same as that of FIG. 6.

In the induced polarization maps of FIGS. 5 and 6 the differences of induced polarization response are apparent. In the map of FIG. 5, the induced polarization data map provides indications of oil as indicated by the areas in the upper right quadrant of the map when the transmitter is located at the layer between depths A1 and A4. Conversely, the induced polarization data map of FIG. 6 which refers to the layer A1 and A2 indicates the presence of substantially more water in the same general area of the reservoir of interest, with water indicated in the same reservoir area.

Accordingly, with the present invention a more precise measure and knowledge of the depth where electromagnetic signal energy is being transmitted is provided. A more accurate reading of the depth location of the transmitting antenna or electrode 30 is available. It can be seen that if the location of the electromagnetic transmitter antenna 30 is properly indicated at A2 instead of A4 a markedly different map of fluid distribution is obtained and measured for the selected reservoir layer It can also be seen that thus it is now possible to have an accurate measurement of the depth position of the BSEM transmitter T downhole.

The invention has been sufficiently described so that a person with average knowledge in the matter may reproduce and obtain the results mentioned in the invention herein Nonetheless, any skilled person in the field of technique, subject of the invention herein, may carry out modifications not described in the request herein, to apply these modifications to a determined structure, or in the manufacturing process of the same, requires the claimed matter in the following claims; such structures shall be covered within the scope of the invention.

It should be noted and understood that there can be improvements and modifications made of the present invention described in detail above without departing from the spirit or scope of the invention as set forth in the accompanying claims.

What is claimed is:

1. A method of induced polarization logging of subsurface earth formations from a well borehole which has a casing installed along its extent into the earth to a location of interest near a formation of interest, the casing being formed of lengths of tubular members connected at end portions to adjacent tubular members by casing collars, the method comprising the steps of:

lowering a borehole to surface electromagnetic survey transmitter with a sonde body connected therewith to the location of interest in the borehole below the casing;

locating a ground electrode at the surface of the earth;

locating an array of surface electromagnetic field receivers at spaced positions over a surface area on the earth surface conforming to dimensions of a reservoir of interest;

forming a measure with the casing collar locator of the number of casing collars past which the source and sonde body travel during the step of lowering to determine the depth of the source and sonde body in the borehole based on the measured number of casing collars;

deactivating the casing collar locator when the source and the sonde body are at the location of interest; and emitting an electromagnetic field from the borehole to surface electromagnetic survey transmitter at the location of interest to travel through the subsurface formations to the surface and form an electromagnetic field;

sensing the formed electromagnetic field with the array of surface electromagnetic field receivers;

detecting with the array of surface electromagnetic field receivers a measure of induced polarization resulting from the electromagnetic field emitted from the borehole to surface electromagnetic energy field for induced polarization logging of the subsurface earth formations.

2. The method of claim 1, further including the step of: sensing fluid pressure in the well borehole at the location of the sonde body during the induced polarization logging.

3. The method of claim 1, further including the step of: sensing temperature in the well borehole at the location of the sonde body during the induced polarization logging.

4. The method of claim 1, further including the step of: moving the electric current source and the sonde body to a changed location of interest in the borehole.

5. The method of claim 4, further including the step of: emitting an electromagnetic field from the borehole to surface electromagnetic survey transmitter at the changed location of interest.

6. The method of claim 5, wherein the location of interest is in the casing in the well borehole.

7. The method of claim 5, wherein the location of interest is in the open zone in the well borehole.

8. An induced polarization logging apparatus for conducting induced polarization logging of subsurface earth formations from a well borehole with electromagnetic field responses sensed by an array of receivers at the earth surface as a result of electric current flow from the borehole, the borehole having a casing installed along its extent into the earth to a location near a formation of interest, the casing being formed of lengths of tubular members connected at end portions to adjacent tubular members by casing collars, the induced polarization logging apparatus comprising:
a borehole to surface electromagnetic survey transmitter comprising:
a conductive bar emitting an electromagnetic field for travel through the earth from the well borehole through the subsurface formations to the earth surface when activated;
a control circuit activating the conductive bar to emit the electromagnetic energy as an electromagnetic field for a selected time and duration;
a sonde body housing the control circuit and being lowered by the wireline in the well borehole to the location near the formation of interest;
the conductive bar being located below a lowermost portion of and mounted to the sonde body below the lowermost portion of the sonde body;
an upper connector subassembly mounted above the sonde body connecting the control circuit to the wireline and permitting the flow of electrical current to the conductive bar;
a lower connector subassembly between the sonde body and the conductive bar and connecting the conductive bar to the control circuit in the sonde body;
a casing collar locator mounted in the sonde body and providing indications of the movement of the sonde body past casing collar in the casing during movement of the transmitter through the well borehole;
a fluid pressure sensor mounted in the sonde body for measuring fluid pressure in the well borehole at the location of the sonde body during induced polarization logging surveys; and
a temperature sensor mounted in the sonde body for measuring temperature in the well borehole at the location of the sonde body during the induced polarization logging surveys; and
a receiver array comprising a plurality of electromagnetic field receivers located at spaced positions on the earth over a surface area to detect the induced polarization resulting from the electromagnetic field formed by travel of the electromagnetic energy field from the borehole to surface electromagnetic survey transmitter through the subsurface earth formations to the receiver array.

9. The apparatus of claim 8, wherein the receivers of the receiver array are located at spaced positions on the earth over a surface area conforming to dimensions of a reservoir of interest.

10. The apparatus of claim 8, further including:
a weight bar located below and mounted to the conductive bar.

* * * * *